US009775048B2

(12) United States Patent
Reddy et al.

(10) Patent No.: US 9,775,048 B2
(45) Date of Patent: Sep. 26, 2017

(54) PERFORMANCE OF A USER EQUIPMENT (UE) IN UNLICENSED SPECTRUM

(71) Applicant: QUALCOMM Incorporated, San Diego, CA (US)

(72) Inventors: Akula Aneesh Reddy, San Diego, CA (US); Nachiappan Valliappan, San Diego, CA (US); Ahmed Kamel Sadek, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/486,778

(22) Filed: Sep. 15, 2014

(65) Prior Publication Data

US 2015/0085792 A1  Mar. 26, 2015

Related U.S. Application Data

(60) Provisional application No. 61/881,837, filed on Sep. 24, 2013, provisional application No. 61/914,711, filed on Dec. 11, 2013.

(51) Int. Cl.
*H04W 80/04* (2009.01)
*H04W 16/14* (2009.01)

(52) U.S. Cl.
CPC .................................. *H04W 16/14* (2013.01)

(58) Field of Classification Search
CPC ..... H04W 86/04; H04W 84/12; H04W 88/06; H04W 36/18; H04W 36/0011
See application file for complete search history.

(56) References Cited

U.S. PATENT DOCUMENTS

2009/0129332 A1  5/2009  Dayal et al.
2009/0285169 A1  11/2009  Yang et al.
(Continued)

FOREIGN PATENT DOCUMENTS

WO  WO-2010/147956 A2  12/2010
WO  WO-2011/134491 A1  11/2011
(Continued)

OTHER PUBLICATIONS

Intel Corporation: "Discussion on in-device coexistence scenarios and solutions", 3GPP Draft; R2-104382, 3rd Generation Partnership Project (3GPP), Mobile Competence Centre; 650, Route Des Lucioles ; F-06921 Sophia-Antipolis Cedex; France, vol. RAN WG2, no. Madrid, Spain; 20100823, Aug. 16, 2010, XP050451684, [retrieved on Aug. 16, 2010] paragraph [02.1]—paragraph [02.2] paragraph [03.2] —paragraph [03.3].
(Continued)

*Primary Examiner* — Andrew Lee
(74) *Attorney, Agent, or Firm* — Arent Fox, LLP and Qualcomm, Incorporated

(57) ABSTRACT

The present disclosure presents a method and an apparatus for improving performance of a user equipment (UE) operating in unlicensed spectrum. For example, the disclosure presents a method for receiving, at the UE, a secondary component carrier (SCC) update from a small cell. The example method further includes tuning the UE to a second SCC in response to receiving the update. The update is received at the UE when the small cell operating on a first radio access technology (RAT) determines that a channel associated with a first SCC of the small cell is also in use by another entity operating on a second RAT. As such, improved performance of a user equipment (UE) operating in an unlicensed spectrum may be achieved.

28 Claims, 12 Drawing Sheets

(56) References Cited

U.S. PATENT DOCUMENTS

| | | |
|---|---|---|
| 2010/0172254 A1 | 7/2010 | Sachs |
| 2011/0128895 A1 | 6/2011 | Sadek et al. |
| 2012/0069766 A1 | 3/2012 | Fu et al. |
| 2012/0082140 A1 | 4/2012 | Lin et al. |
| 2012/0093009 A1 | 4/2012 | Wang et al. |
| 2012/0170557 A1 | 7/2012 | Tsfati et al. |
| 2012/0243498 A1 | 9/2012 | Kwon et al. |
| 2012/0250631 A1 | 10/2012 | Hakola et al. |
| 2012/0264468 A1* | 10/2012 | Turtinen ............... H04L 5/001 455/509 |
| 2013/0003591 A1 | 1/2013 | Novak et al. |
| 2013/0010766 A1 | 1/2013 | Sadek et al. |
| 2013/0034018 A1* | 2/2013 | Wei ................ H04W 72/0453 370/254 |
| 2013/0058245 A1* | 3/2013 | Van Lieshout ... H04W 36/0083 370/252 |
| 2013/0083661 A1* | 4/2013 | Gupta ................. H04W 4/005 370/235 |
| 2013/0094467 A1* | 4/2013 | Kwon ................. H04L 5/001 370/329 |
| 2013/0142059 A1 | 6/2013 | Di Girolamo et al. |
| 2013/0178225 A1 | 7/2013 | Xing |
| 2013/0194981 A1* | 8/2013 | Wang ................. H04L 1/1671 370/280 |
| 2013/0208587 A1 | 8/2013 | Bala et al. |
| 2013/0235814 A1 | 9/2013 | Wietfeldt et al. |
| 2013/0242924 A1* | 9/2013 | Kim ................. H04W 72/042 370/329 |
| 2013/0272260 A1 | 10/2013 | Bitran et al. |
| 2014/0036818 A1 | 2/2014 | Koskela et al. |
| 2014/0044000 A1 | 2/2014 | Charbit et al. |
| 2014/0044105 A1 | 2/2014 | Bontu et al. |
| 2014/0045494 A1* | 2/2014 | Pekonen .......... H04W 36/0005 455/434 |
| 2014/0050146 A1 | 2/2014 | Chrisikos et al. |
| 2014/0050170 A1 | 2/2014 | Xu et al. |
| 2014/0087748 A1* | 3/2014 | Hong ................ H04W 72/1215 455/452.1 |
| 2014/0126403 A1 | 5/2014 | Siomina |
| 2014/0301351 A1 | 10/2014 | Gao et al. |
| 2015/0055621 A1* | 2/2015 | Koskinen .............. H04W 36/18 370/331 |
| 2015/0063245 A1* | 3/2015 | Gao ................... H04W 52/248 370/329 |
| 2015/0085683 A1 | 3/2015 | Sadek et al. |
| 2015/0085684 A1 | 3/2015 | Sadek |
| 2015/0085792 A1 | 3/2015 | Reddy et al. |
| 2015/0085841 A1 | 3/2015 | Sadek |
| 2015/0163794 A1* | 6/2015 | Liang ................ H04W 72/042 370/329 |
| 2015/0163801 A1 | 6/2015 | Sadek |
| 2015/0163823 A1 | 6/2015 | Sadek et al. |
| 2015/0208413 A1* | 7/2015 | Takano ................ H04W 16/32 455/454 |
| 2015/0236782 A1 | 8/2015 | Kadous et al. |

FOREIGN PATENT DOCUMENTS

| | | |
|---|---|---|
| WO | WO-2012/092574 A1 | 7/2012 |
| WO | WO-2012/093349 A2 | 7/2012 |
| WO | WO-2012/101481 A1 | 8/2012 |
| WO | WO-2013/006988 A1 | 1/2013 |
| WO | WO-2013/009347 A1 | 1/2013 |
| WO | WO-2013/019177 A1 | 2/2013 |
| WO | WO-2013/063808 A1 | 5/2013 |
| WO | WO-2013/071488 A1 | 5/2013 |
| WO | WO-2013/100827 A1 | 7/2013 |
| WO | WO-2013/112983 A2 | 8/2013 |
| WO | WO-2013/131257 A1 | 9/2013 |
| WO | WO-2013/133928 A1 | 9/2013 |

OTHER PUBLICATIONS

International Search Report and Written Opinion—PCT/US2014/056533—ISA/EPO—Apr. 17, 2015.

Ratasuk R. et al., "License-Exempt LTE Deployment in Heterogeneous Network", Wireless Communication Systems (ISWCS), 2012 International Symposium on, IEEE, Aug. 28, 2012 , pp. 246-250 , XP032263759, DOI: 10.1109/ISWCS.2012.6328367, ISBN: 978-1-4673-0761-1.

ZTE: "Further analysis on in-device coexistence interference avoidance solutions", 3GPP Draft; R2-105361 Further Analysis on In-Device Coexistence Interference, 3rd Generation Partnership Project (3GPP), Mobile Competence Centre; 650, Route Des Lucioles; F-06921 Sophia-Antipolis Cedex; France, vol. RAN WG2, No. Xi 'An, China; 20101011, Oct. 3, 2010, pp. 1-8, XP050452409, [retrieved on Oct. 3, 2010].

Ericsson: "DRX with Carrier Aggregation in LTE-Advanced" 3GPP Draft; R2-092959 DRX in Carrier Aggregation LTE-Advanced, SRD Generation Partnership Project (3GPP), Mobile Competence Centre; 650, Route Des Lucioles; F-06921 Sophia-Antipolis Cedex; France, no. San Francisco, USA; 20090428, Apr. 28, 2009, pp. 1-3, XP050340753.

Huawei: "Carrier aggregation in active mode", 3GPP Draft; R2-093104 Carrier Aggregation in Active Mode, 3rd Generation Partnership Project (3GPP), Mobile Competence Centre; 650, Route des Lucioles; F-06921 Sophia-Antipolis Cedex; France, no. San Francisco, USA; 20090428, Apr. 28, 2009, 4 Pages, XP050340846, [retrieved on Apr. 28, 2009] p. 2, paragraph 2.3-p. 3.

Wikipedia entry for "Estimation", Aug. 15, 2013, pp. 1-8, Retrieved from the Internet URL: web.archive.org/web/20130815221500/http://en.wikipedia.org/wiki/Estimation_theory, whole document.

Garcia L.G., et al., "Autonomous Component Carrier Selection for Local Area Uncoordinated Deployment of LTE Advanced", 2013 IEEE 78th Vehicular Technology Conference (VTC Fall), XP055260442, Sep. 1, 2009, pp. 1-5, ISSN: 1090-3038, DOI: 10.1109/VETECF.2009.5378826.

\* cited by examiner

PERFORMANCE OF A USER EQUIPMENT (UE) IN UNLICENSED SPECTRUM

CLAIM OF PRIORITY

The present Application for Patent claims the benefit of U.S. Provisional Application No. 61/914,711, entitled "METHOD AND APPARATUS FOR IMPROVING PERFORMANCE OF A USER EQUIPMENT (UE) IN AN UNLICENSES SPECTRUM," filed Dec. 11, 2013 and U.S. Provisional Application No. 61/881,837, entitled "ADAPTING COMMUNICATION BASED ON RESOURCE UTILIZATION," filed Sep. 24, 2013, both assigned to the assignee hereof, and expressly incorporated herein by reference in their entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other RATs that typically utilize the same unlicensed bands, most notably IEEE 802.11x WLAN technologies generally referred to as "Wi-Fi."

There therefore remains a need for improved performance of a user equipment (UE) in unlicensed spectrum.

SUMMARY

Systems and methods for Carrier Sense Adaptive Transmission (CSAT) and related operations for improving performance of a user equipment (UE) operating in an unlicensed spectrum are disclosed.

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for improving performance of a user equipment (UE) operating in an unlicensed spectrum. For example, the present disclosure presents an example method for improving performance of a UE operating in unlicensed spectrum that includes receiving, at the UE, a secondary component carrier (SCC) update from a small cell, and tuning the UE to a second SCC in response to receiving the update, wherein the update is received at the UE when the small cell operating on a first radio access technology (RAT) determines that a channel associated with a first SCC of the small cell is also in use by another entity operating on a second RAT.

Additionally, the present disclosure presents an example apparatus for improving performance of a UE operating in unlicensed spectrum that may include means for receiving, at the UE, a secondary component carrier (SCC) update from a small cell, and means for tuning the UE on a second SCC in response to receiving the update, wherein the update is received at the UE when the small cell operating on a first radio access technology (RAT) determines that a channel associated with a first SCC of the small cell is also in use by another entity operating on a second RAT.

Moreover, in an aspect, the presents disclosure presents an example non-transitory computer readable medium for improving performance of a UE operating in unlicensed spectrum that may comprise code that, when executed by a processor or processing system included within the UE, causes the UE to receive, via a secondary component carrier (SCC) update receiving component, a SCC update from a small cell, and tune, via a SCC tuning component, the UE on a second SCC in response to receiving the update, wherein the update is received at the UE when the small cell operating on a first radio access technology (RAT) determines that a channel associated with a first SCC of the small cell is also in use by another entity operating on a second RAT.

In a further aspect, the present disclosure presents an example apparatus for improving performance of a UE operating in unlicensed spectrum that may include a secondary component carrier (SCC) update receiving component to receive a SCC update from a small cell, and a SCC tuning component to tune the UE on a second SCC in response to receiving the update, wherein the update is received at the UE when the small cell operating on a first radio access technology (RAT) determines that a channel associated with a first SCC of the small cell is also in use by another entity operating on a second RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to Carrier Sense Adaptive Transmission (CSAT) communication and various related aspects to improve performance of a user equipment (UE) operating in an unlicensed spectrum. For example, in an aspect, the UE may receive a secondary component carrier (SCC) update from a small cell. The SCC update is transmitted from the small cell to the UE when the small cell determines that a channel (e.g., frequency) associated with the SCC is also in use by another entity operating on a RAT which is different from a RAT the small cell is operating. Upon receiving the SCC update, the UE tunes to a channel based on the information received in the SCC update.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
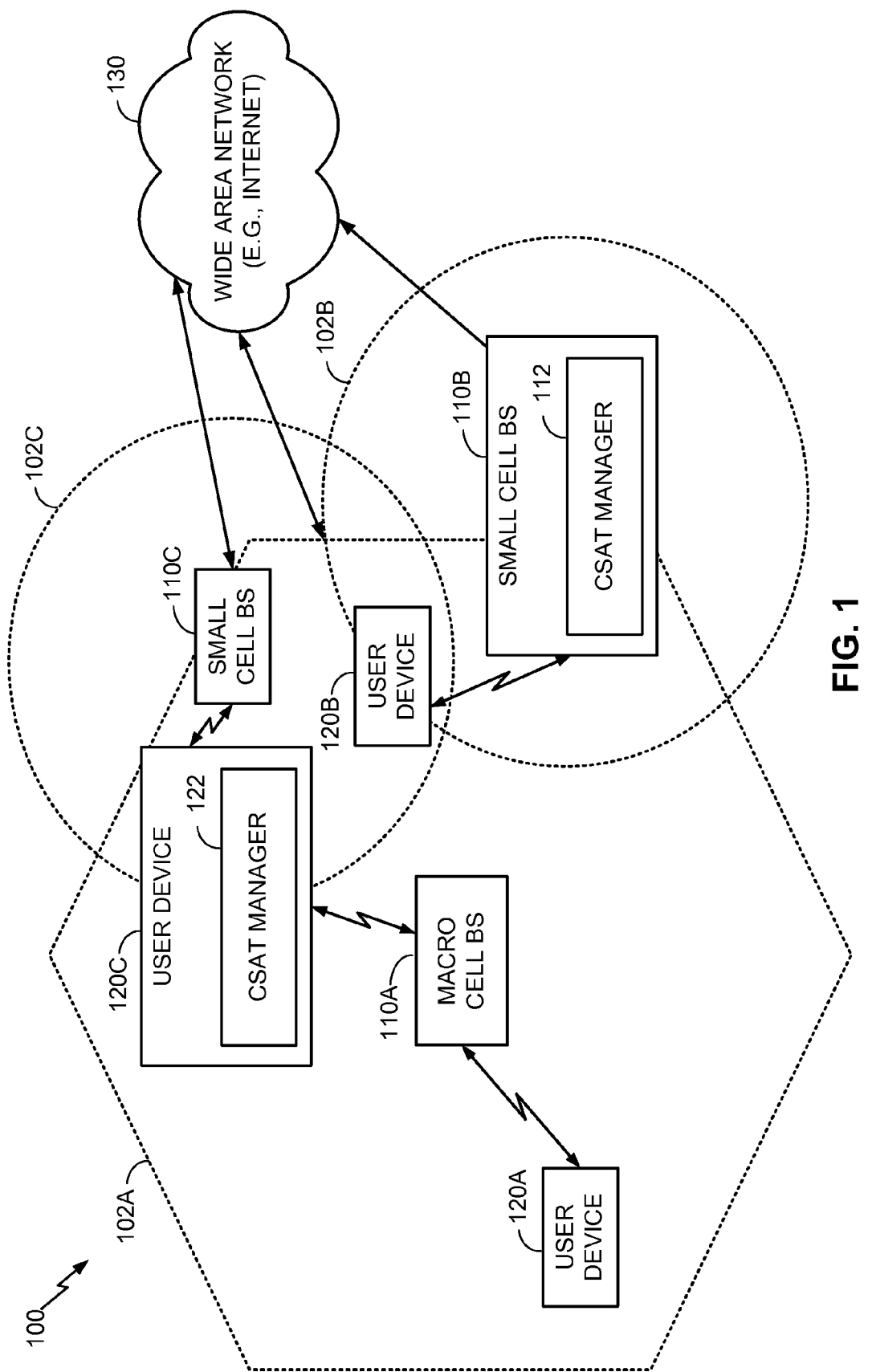
FIG. 1 illustrates an example mixed-deployment wireless communication system including macro cell base stations and small cell base stations.

FIG. 1 illustrates an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the CSAT and related operations discussed briefly above. For example, one or more of the small cell base stations 110 may include a CSAT management module 112, while one or more of the user devices 120 may include a CSAT management module 122.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3.

Figure 2:
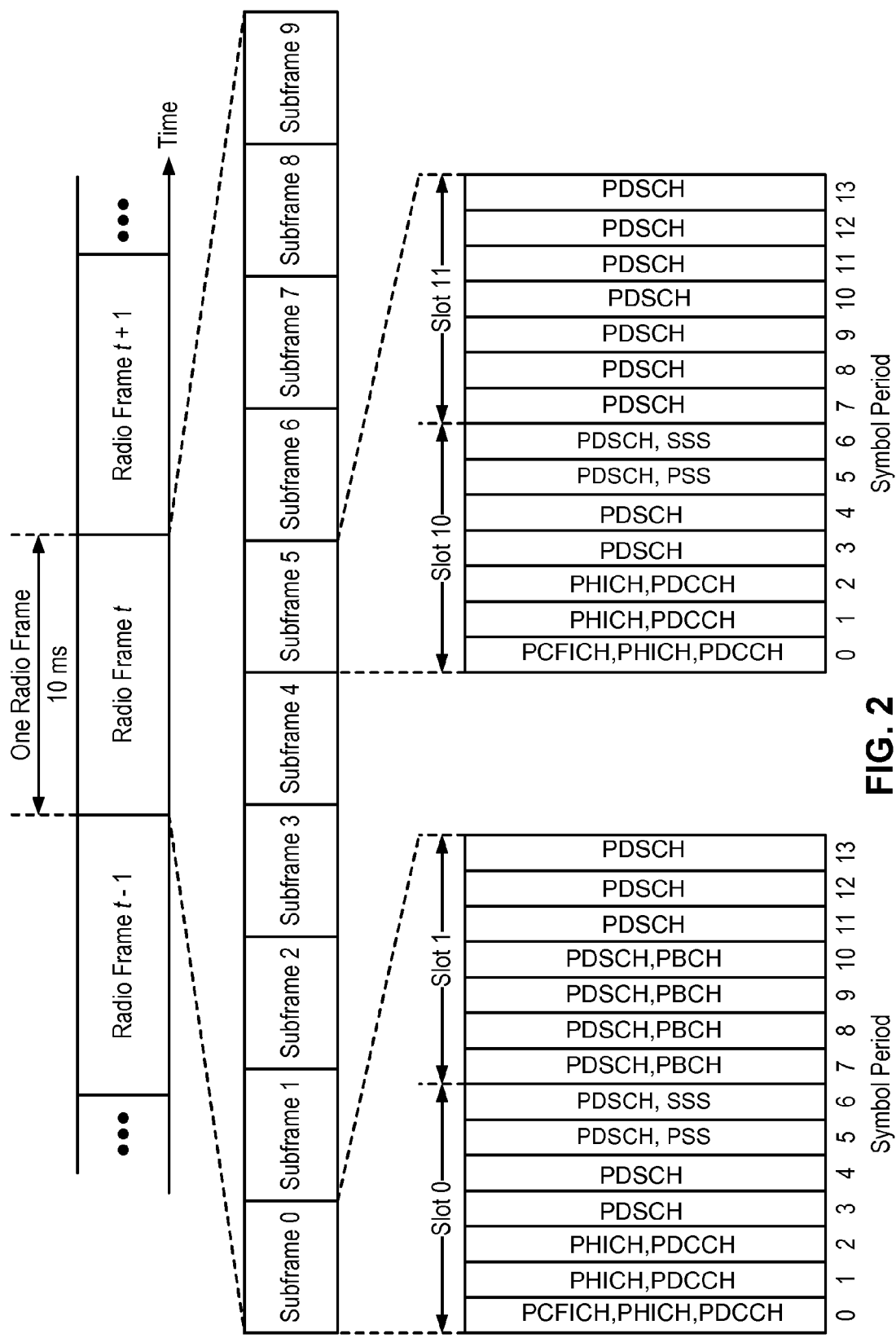
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0.The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
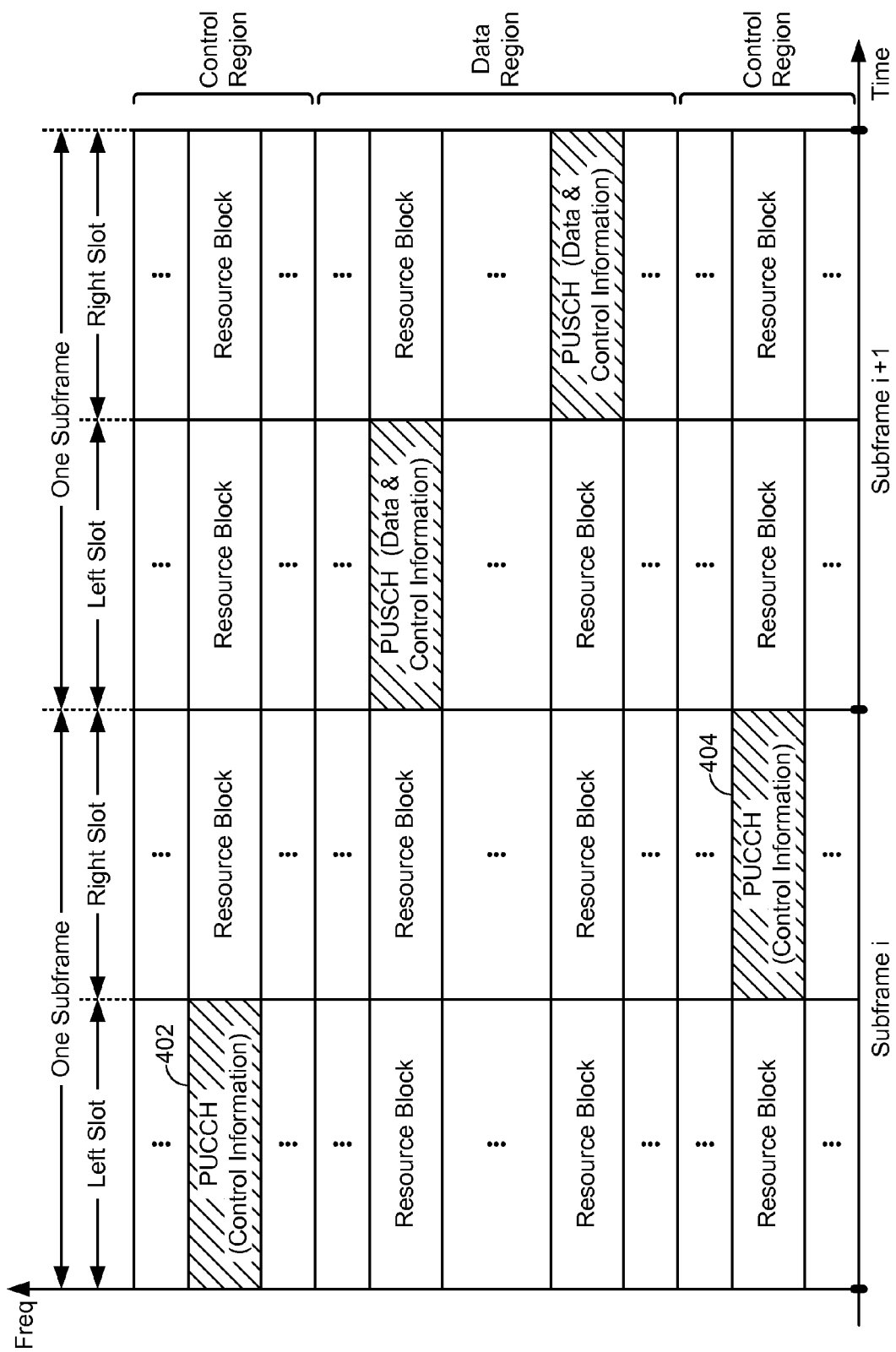
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells) or secondary component carriers (SCCs). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
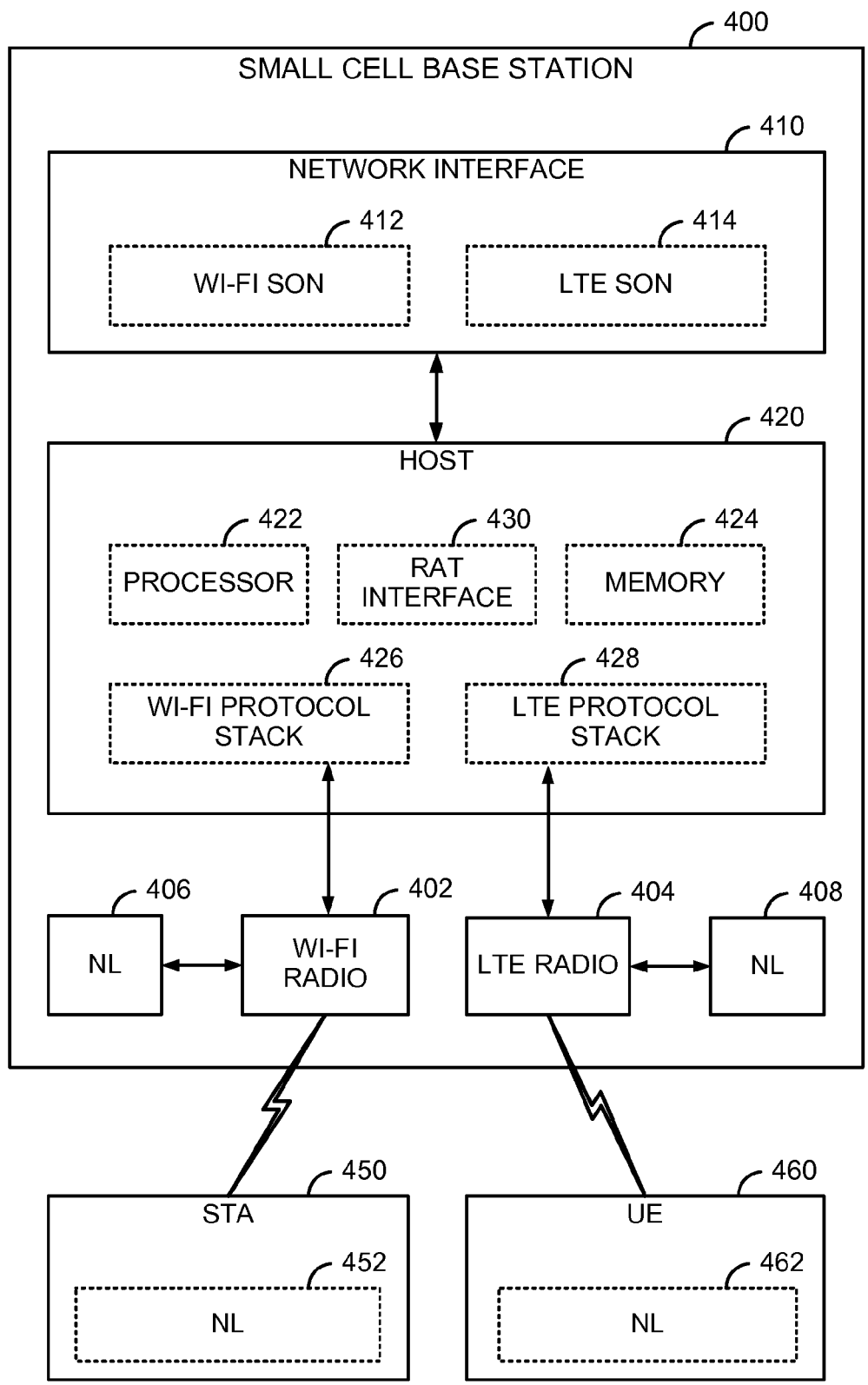
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s).

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

Figure 5:
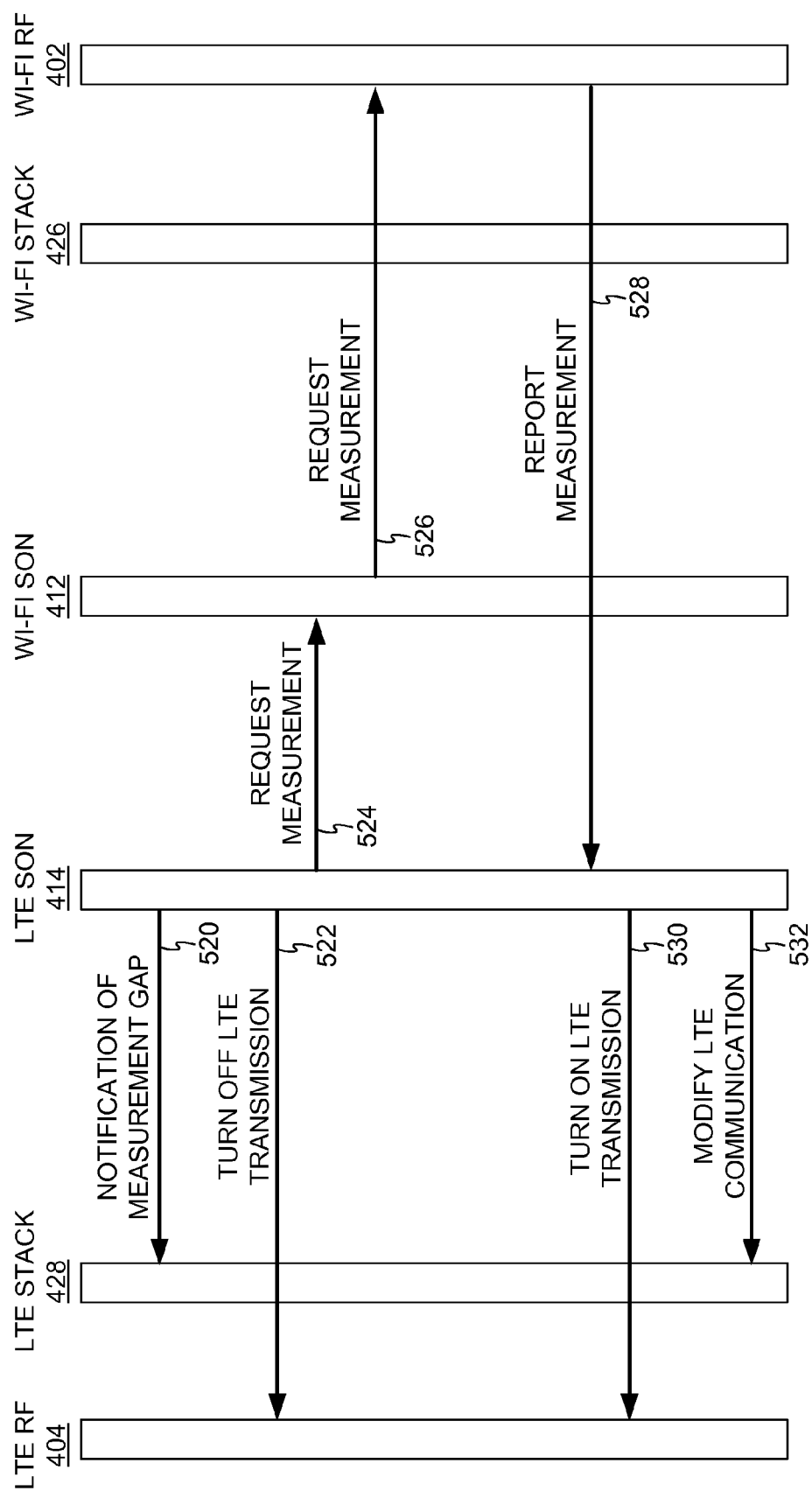
FIG. 5 is a signaling flow diagram illustrating an example message exchange between co-located radios.

FIG. 5 is a signaling flow diagram illustrating an example message exchange between co-located radios. In this example, one RAT (e.g., LTE) requests a measurement from another RAT (e.g., Wi-Fi) and opportunistically ceases transmission for the measurement. FIG. 5 is explained below with continued reference to FIG. 4.

Initially, the LTE SON 414 notifies the LTE stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables the appropriate RF components for a period of time (e.g., so as to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi stack 426 and the Wi-Fi SON 412. In some instances, the measurement report may include not only measurements performed by the Wi-Fi radio 402 itself, but also measurements collected by the Wi-Fi radio 402 from the STA 450. The LTE SON 414 may then send a command 530 to cause the LTE radio 402 to turn back on transmission on the unlicensed band (e.g., at the end of the defined period of time).

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 400 may specially adapt different aspects of its cellular operations in order to manage co-existence between the different RATs. Returning to FIG. 5, the LTE SON 414, for example, may then send a message 532 that informs the LTE stack 428 how LTE communication is to be modified.

There are several aspects of cellular operation that may be adapted in order to manage co-existence between the different RATs. For example, the small cell base station 400 may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
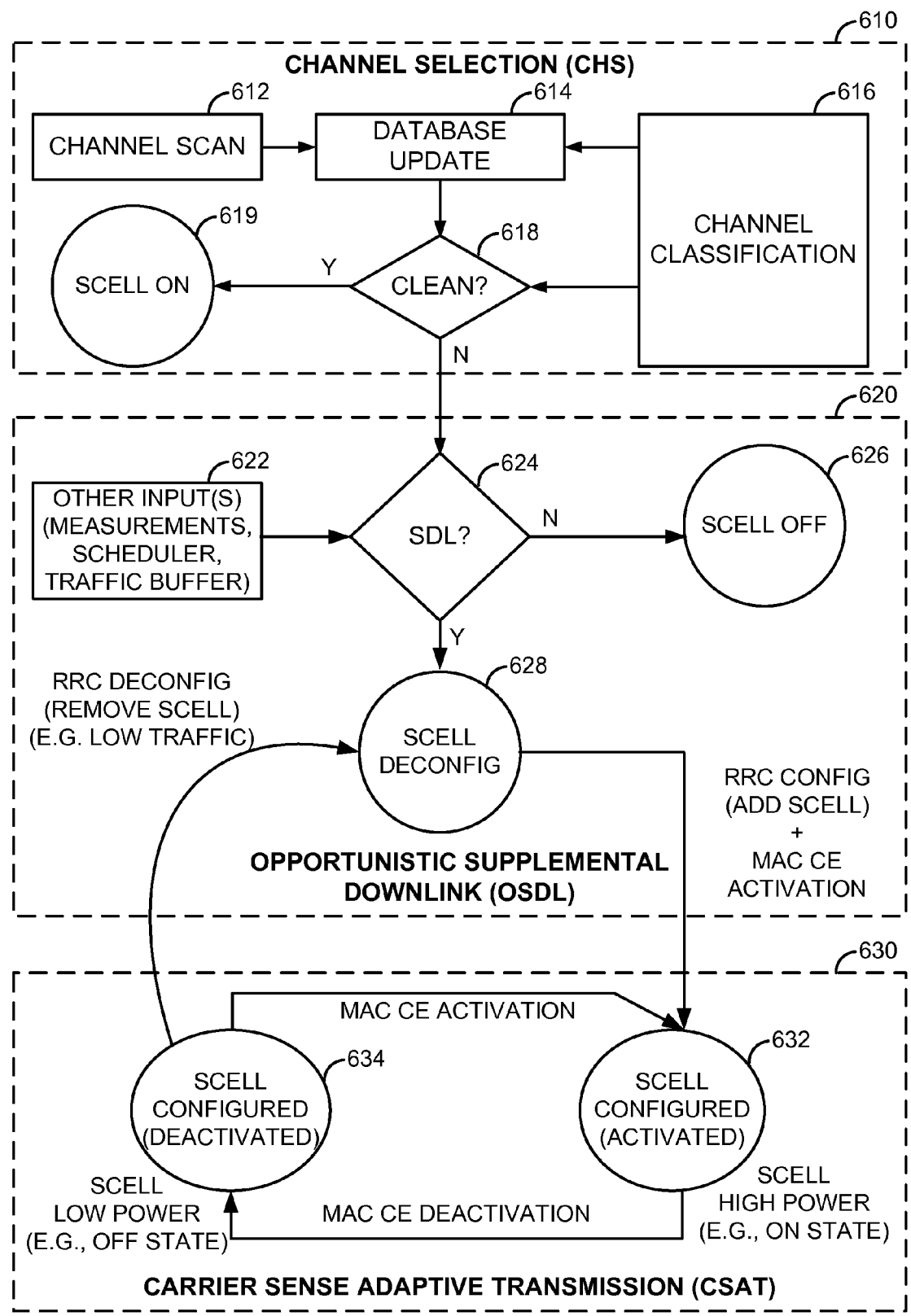
FIG. 6 is a system-level co-existence state diagram illustrating different aspects of cellular operation that may be specially adapted to manage co-existence between different Radio Access Technologies (RATs) operating on a shared unlicensed band.

FIG. 6 is a system-level co-existence state diagram illustrating different aspects of cellular operation that may be specially adapted to manage co-existence between different RATs operating on a shared unlicensed band. As shown, the techniques in this example include operations that will be referred to herein as Channel Selection (CHS) where appropriate unlicensed carriers are analyzed, Opportunistic Supplemental Downlink (OSDL) where operation on one or more corresponding SCells is configured or deconfigured, and Carrier Sense Adaptive Transmission (CSAT) where the transmission power on those SCells is adapted, if necessary, by cycling between periods of high transmission power (e.g., an ON state, as a special case) and low transmission power (e.g., an OFF state, as a special case).

For CHS (block 610), a channel selection algorithm may perform certain periodic or event-driven scanning procedures (e.g., initial or threshold triggered) (block 612). With reference to FIG. 4, the scanning procedures may utilize, for example, one or a combination of the Wi-Fi radio 402, the LTE radio 404, the STA 420, and/or the UE 430. The scan results may be stored (e.g., over a sliding time window) in a corresponding database (block 614) and used to classify the different channels in terms of their potential for cellular operation (block 616). For example, a given channel may be classified, at least in part, based on whether it is a clean channel or whether it will need to be afforded some level of protection for co-channel communications. Various cost functions and associated metrics may be employed in the classification and related calculations.

If a clean channel is identified ('yes' at decision 618), a corresponding SCell may be operated without concern for impacting co-channel communications (state 619). On the other hand, if no clean channel is identified, further processing may be utilized to reduce the impact on co-channel communications ('no' at decision 618), as described below.

Turning to OSDL (block 620), input may be received from the channel selection algorithm as well as from other sources, such as various measurements, schedulers, traffic buffers, etc. (block 622), to determine whether unlicensed operation is warranted without a clean channel being available (decision 624). For example, if there is not enough traffic to support a secondary carrier in the unlicensed band ('no' at decision 624), the corresponding SCell that supports it may be disabled (state 626). Conversely, if there is a substantial amount of traffic ('yes' at decision 624), even though a clean channel is not available, an SCell may nevertheless be constructed from one or more of the remaining carriers by invoking CSAT operation (block 630) to mitigate the potential impact on co-existence.

Returning to FIG. 6, the SCell may be initially enabled in a deconfigured state (state 628). The SCell along with one or more corresponding user devices may then be configured and activated (state 630) for normal operation. In LTE, for example, an associated UE may be configured and deconfigured via corresponding RRC Config/Deconfig messages to add the SCell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the SCell from the UE's active set, and return the system to the deconfigured state (state 628). If all UEs are deconfigured, OSDL may be invoked to turn the SCell off.

During CSAT operation (block 630), the SCell may remain configured but be cycled between periods of activated operation (state 632) and periods of deactivated operation (state 634) in accordance with a (long-term) Time Division Multiplexed (TDM) communication pattern. In the configured/activated state (state 632), the SCell may operate at relatively high power (e.g., full powered ON state). In the configured/deactivated state (state 634), the SCell may operate at a reduced, relatively low power (e.g., depowered OFF state).

Figure 7:
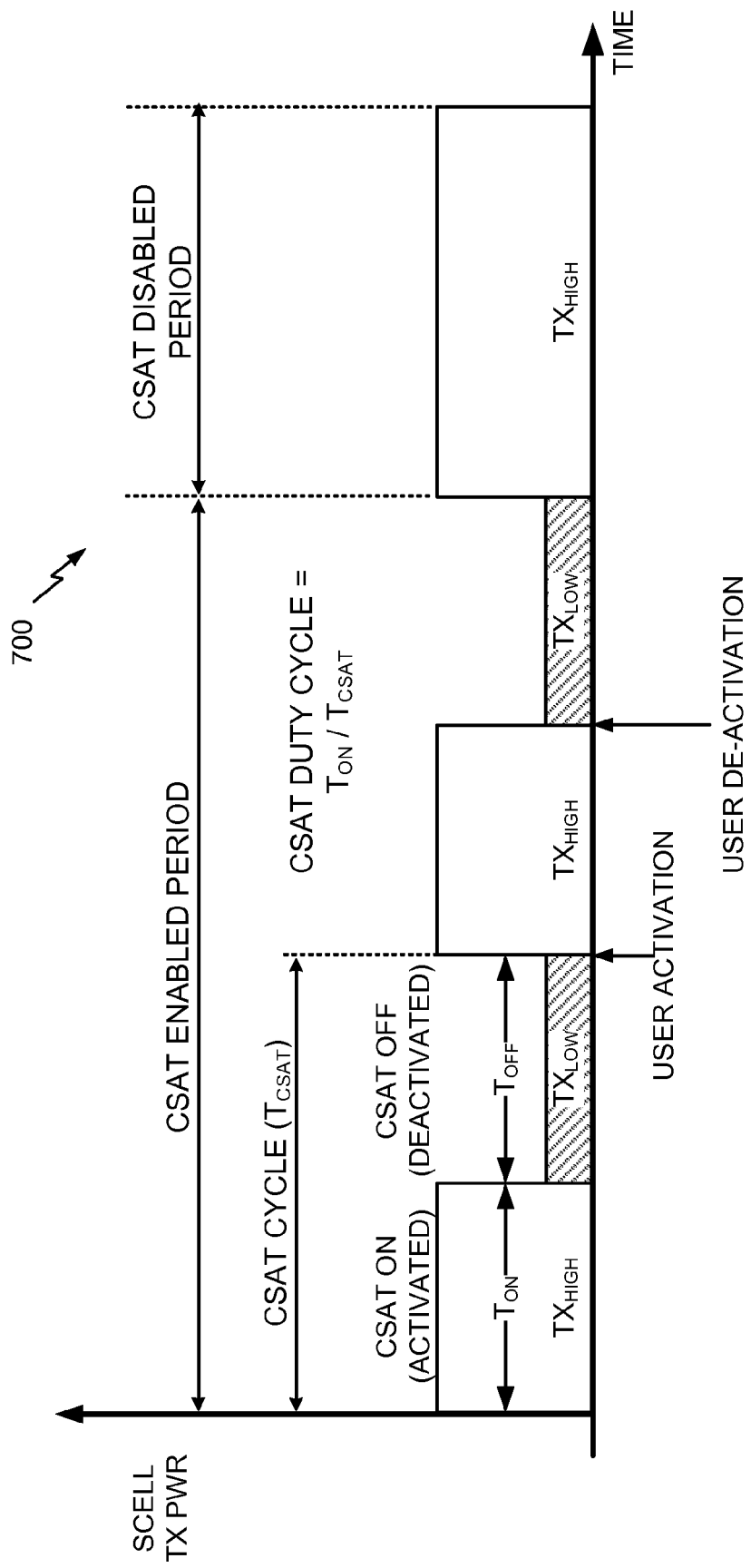
FIG. 7 illustrates in more detail certain aspects a Carrier Sense Adaptive Transmission (CSAT) communication scheme for cycling cellular operation in accordance with a long-term Time Division Multiplexed (TDM) communication pattern.

FIG. 7 illustrates in more detail certain aspects a CSAT communication scheme for cycling cellular operation in accordance with a long-term TDM communication pattern. As discussed above in relation to FIG. 6, CSAT may be selectively enabled on one or more SCells (e.g., small cell base station 400 of FIG. 4) as appropriate to facilitate co-existence in unlicensed spectrum, even when a clean channel free of competing RAT operation is not available.

When enabled, SCell operation is cycled between CSAT ON (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time $T_{ON}$, SCell transmission on the unlicensed band may proceed at a normal, relatively high transmission power. During an associated deactivated period of time $T_{OFF}$, however, the SCell remains in a configured state but transmission on the unlicensed band is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$), cycle timing (e.g., the start/stop time of each CSAT cycle), and the relative transmission powers during activated/deactivated periods, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel. Conversely, if utilization of a given channel by Wi-Fi devices is low, an LTE radio may adjust one or more of the CSAT parameters such that usage of the channel by the LTE radio is increased. For example, the LTE radio may increase its transmit duty cycle or transmit power on the channel. In either case, the CSAT ON (activated) periods may be made sufficiently long (e.g., greater than or equal to about 200 msec) to provide user devices with a sufficient opportunity to perform at least one measurement during each CSAT ON (activated) period.

A CSAT scheme as provided herein may offer several advantages for mixed RAT co-existence, particular in unlicensed spectrum. For example, by adapting communication based on signals associated with a first RAT (e.g., Wi-Fi), a second RAT (e.g., LTE) may react to utilization of a co-channel by devices that use the first RAT while refraining from reacting to extraneous interference by other devices (e.g., non-Wi-Fi devices) or adjacent channels. As another example, a CSAT scheme enables a device that uses one RAT to control how much protection is to be afforded to co-channel communications by devices that use another RAT by adjusting the particular parameters employed. In addition, such a scheme may be generally implemented without changes to the underlying RAT communication protocol. In an LTE system, for example, CSAT may be generally implemented without changing the LTE PHY or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON, min}$) and a minimum CSAT OFF (deactivated) period ($T_{OFF, min}$). Accordingly, the CSAT ON (activated) period durations and transmission powers may be different, but minimum deactivation times and certain channel selection measurement gaps may be synchronized.

Figure 8:
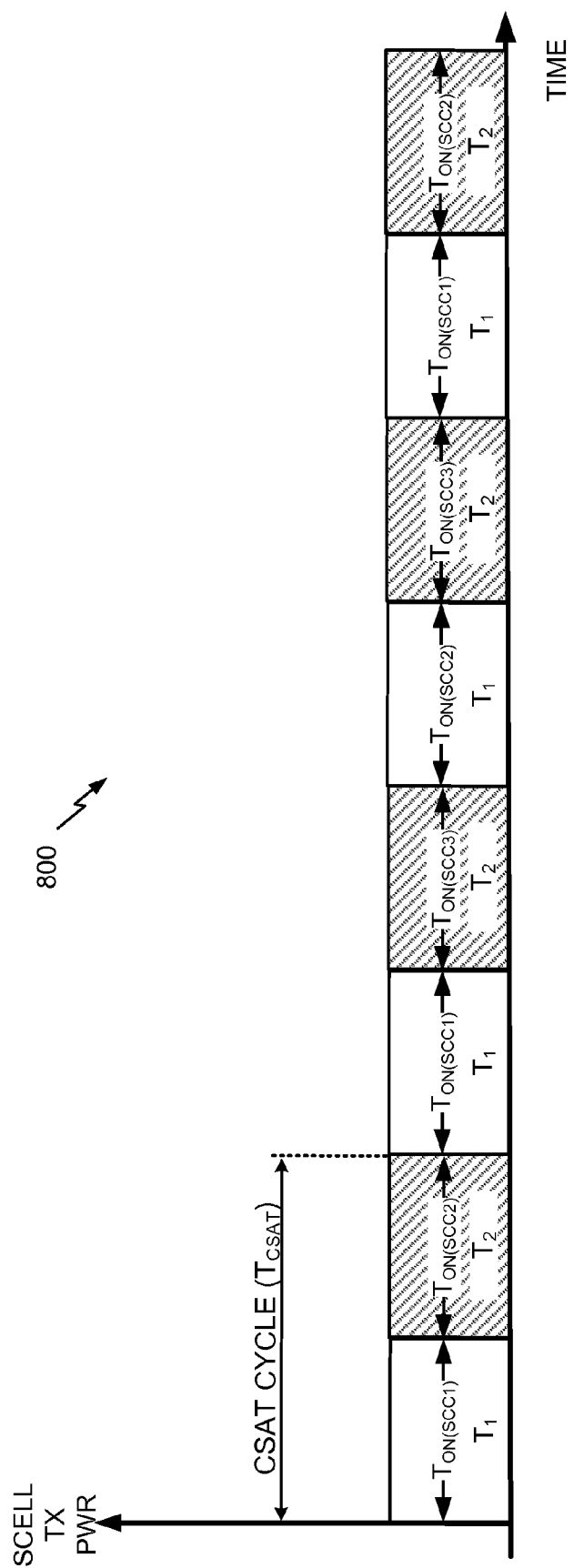
FIG. 8 illustrates in more detail certain aspects a Carrier Sense Adaptive Transmission (CSAT) communication scheme for improving performance of a user equipment (UE) as taught herein.

FIG. 8 illustrates in more detail certain aspects of a CSAT communication scheme for improving performance of a UE in unlicensed spectrum.

In an aspect, FIG. 8 illustrates an example diagram with LTE transmissions of small cell base station 400 (FIG. 4) in the unlicensed spectrum during time period $T_1$ and $T_2$. For example, in an aspect, small cell base station 400 may transmit during time period $T_1$ on a secondary carrier component 1 (SCC1) (e.g. channel 1) and may transmit during time period $T_2$ on a SCC2 (e.g., channel 2). The SCCs may be configured with channels or frequencies in the unlicensed spectrum.

In an aspect, small cell base station 400 may support carrier aggregation that may include up to four component carriers (CCs). For example, small cell base station 400 may support carrier aggregation that includes one primary component carrier (PCC) and up to three secondary component carriers (SCCs). That is, small cell base station 400 may support carrier aggregation that includes 1 PCC+3 SCC, for example, on a downlink from small cell base station 400 to UE 460. In a further additional aspect, UE 460 may support carrier aggregation that may include up to two CCs, for example, on a uplink from UE 460 to small cell base station 400. For example, UE 460 may support carrier aggregation that includes one PCC and one SCC. That is, UE 460 may support carrier aggregation that includes 1 PCC+1 SCC. In an aspect, for example, SCC1, SCC2, and/or SCC3 may be respectively associated with channels of frequencies 1, 2, and/or 3 in the unlicensed spectrum. In an additional or optional aspect, the PCCs are configured with channels or frequencies in the licensed spectrum and the SCCs are configured with channels or frequencies in the unlicensed spectrum.

During time period $T_2$ (identified as $T_{OFF}$ in FIG. 7 above), small cell base station 400 may hop to a different channel (e.g., channel 2) which may give some time with less interference or free of interference (from the small cell base station) to Wi-Fi that may be operating on the first channel. In an aspect, small cell base station 400 will indicate the moving of the small cell base station from SCC1 to SCC2 (e.g., moving from the first channel to the second channel) to the UE, via a SCC update, and the UE tunes to the second channel during $T_2$. Once the UE receives the SCC update indicating the moving of the small cell base station 400, the UE will tune to the second channel for receiving data.

In an aspect, for example, during a second CSAT cycle of FIG. 8, LTE transmissions of small cell base station 400 may be scheduled on SCC1 during time period $T_1$ and on SCC3 during time period $T_2$. Once the UE receives the SCC update from the small cell, the UE will tune to SCC3 during time period $T_2$ for receiving data from the small cell base station.

In an additional aspect, for example, during a third CSAT cycle of FIG. 8, LTE transmissions of small cell base station 400 may be scheduled on SCC2 during time period $T_1$ and on SCC3 during time period $T_2$. Once the UE receives the SCC update from the small cell, the UE will tune to SCC3 during time period $T_2$ for receiving data from the small cell base station.

As described above, scheduling of LTE transmissions of small cell base station 400 on different SCCs (or channels) during time period $T_2$, and the tuning of the UE to the different SCCs (channels) during time period $T_2$, will improve the performance of UE 460 as UE 460 is receiving data during time period $T_2$ (i.e., $T_{OFF}$) as well.

Figure 9:
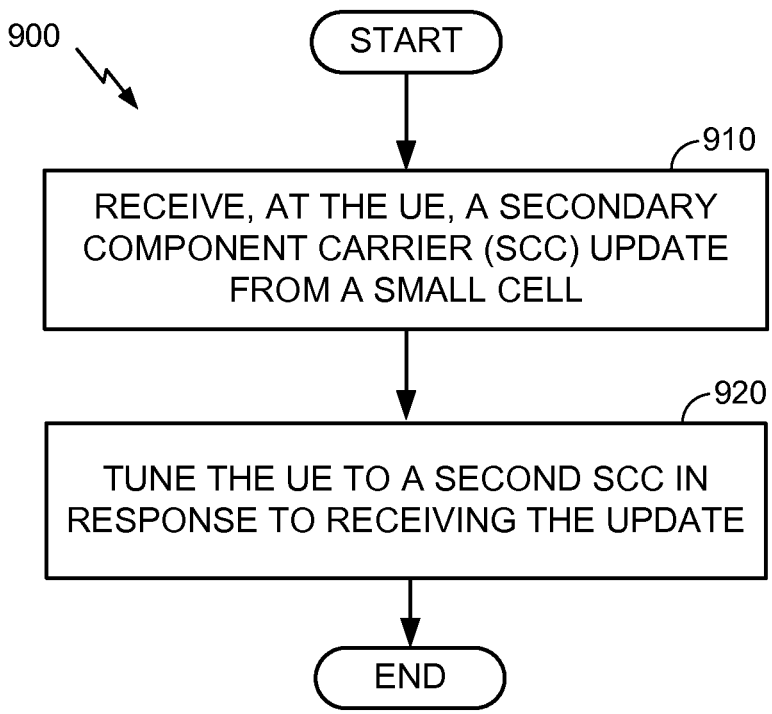
FIG. 9 is a flow diagram illustrating an example method for improving performance of a user equipment (UE) in unlicensed spectrum.

FIG. 9 illustrates an example methodology 900 for improving performance of a user equipment (UE) in an unlicensed spectrum.

In an aspect, at block 910, methodology 900 may include receiving, at the UE, a secondary component carrier (SCC) update from a small cell. For example, in an aspect, UE 460 may include a specially programmed processor module, or a processor executing specially programmed code stored in a memory to receive a secondary component carrier (SCC) update from a small cell (e.g., small cell base station 400).

In an aspect, small cell base station 400 (FIG. 4) may be sharing the channel with a nearby Wi-Fi radio in an unlicensed spectrum. In an additional aspect, small cell base station 400 may be operating on long term evolution (LTE) RAT.

In an aspect, during time period $T_2$, small cell base station 400 (FIG. 4) may hop onto a second channel which may give some interference-free (or less interference) time to nearby Wi-Fi radio operating on the first channel. When the small cell base station hops onto the second channel, the small cell base station may send a SCC update (which indicates the move from SCC1 to SCC2 during time period $T_2$) to UE 460 and schedule the UE on the second channel during time period $T_2$ so that the UE can receive data during $T_2$ as well. In an additional or optional aspect, the SCC update may notify the UE about any changes in the SCC configuration.

In an aspect, at block 920, methodology 900 may include tuning the UE to a second SCC (e.g., different SCC, SCC2 or SCC3) in response to receiving the update. For example, in an aspect, UE 460 may include a specially programmed processor module, or a processor executing specially programmed code stored in a memory to tune UE 460 to a second SCC in response to receiving the update. That is, UE 460 may tune to a different SCC after receiving the SCC update from small cell base station 400. For example, UE 460 may tune the SCC on SCC2 or SCC3 based on the information in the SCC update received from the small cell base station. In an additional aspect, as described above, UE 460 may receive the update from small cell base station 400 when the small cell base station is operating on a first RAT (e.g., LTE) and the small cell base station determines (or detected via a co-located listening module) that a channel associated with the SCC of the small cell base station is also in use by another entity operating on a second RAT (e.g., nearby Wi-Fi radio).

For example, tuning the UE to a different SCC may include receiving the data on a second SCC (e.g., SCC2 or SCC3) from the small cell base station. In an aspect, UE 460 may tune away from SCC1 to SCC2/SCC3 in response to receiving the update from the small cell base station. In an aspect, the tuning of UE 460 on a SCC may include listening to the frequency of the channel associated with that SCC.

In an additional aspect, the tuning of SCC at UE 460 may be performed through fast de-activation/activation feature described in 3GPP Specifications for LTE carrier aggregation. For example, in an aspect, once the SCC update is received at the UE from the small cell base station, the media access control (MAC) layer at UE 460 may initiate the fast de-activation/activation feature for switching between SCCs. The fast de-activation/activation feature reduces the time for switching between SCCs as the SCCs are pre-configured at the UE. Additionally, the fast de-activation/activation feature may improve performance of UE 460 and/or small cell base station 400 by reducing and/or eliminating the loss of data during the switching of SCCs at the UE by minimizing and/or eliminating the need for re-transmissions.

In an aspect, for example, once UE 460 receives the SCC update from the small cell base station, UE 460 may tune the SCC from SCC1 to SCC2/SCC3 (e.g., from SCC1 to SCC2 or from SCC1 to SCC3) by de-activating of SCC1 followed by activating of SCC2. In an aspect, PLMN ID may be used to reduce inter-operator LTE-U interference in the unlicensed spectrum. For example, in an aspect, a combination CGI and PLMN ID may be used to orthogonalize the channel hoping patterns to avoid inter-operator interference between base stations of the first RAT (e.g., LTE base stations). In an additional or optional aspect, intra-operator small cell base stations may hop using the same patterns for RRM measurements purposes based on the common PLMN ID.

In an additional or optional aspect, radio resource control (RRC) layer at the small cell base station may be used for re-configuring SCCs. For example, RRC layer of small cell base station 460 may be used to re-configure (e.g., delete/add, disable/enable) SCCs to enable the small cell base station utilize most of the channels (e.g., frequencies, carriers, etc.) available in the unlicensed spectrum. For example, in an aspect, RRC layer of the small cell base station may be used to delete one or more of SCC1, SCC2, and/or SCC3 and add one or more of SCC4, SCC5, wherein SCC4, SCC5, and/or SCC6 are configured with different channels/frequencies in the unlicensed spectrum. This allows the small cell base station the flexibility in configuring the SCCs for improving performance of small cell base station 400 and/or UE 460.

Additionally, using the entire (or most of) unlicensed spectrum or band for channel or frequency hopping (rather than just limited to the pre-configured SCCs) allows the LTE-U transmissions to be spread across the broader unlicensed spectrum. In an additional or optional aspect, the RRC layer re-configuration may be used in conjunction with the fast de-activation/activation mechanism via the MAC layer. In an aspect, once UE 460 receives a RRC re-configuration message, UE 460 may be tune to the new SCC for receiving data from the small cell base station.

In an additional or optional aspect, load balancing may be taken into considering prior to selecting the SCC for transmissions. For example, in an aspect, small cell base station 400 may determine that SCC3 (frequency associated with SCC3) is lightly used, for example, based on small number of UEs scheduled on SCC3 or that low data demand UEs are scheduled on SCC3. As a result, small cell base station may select SCC3 and notify the UE accordingly. In a further additional or optional aspect, low data demand UEs may be scheduled on SCCs whose frequencies are fixed. Additionally, the spreading of LTE-U transmissions on the SCCs may be performed in a non-uniform manner. The non-uniform distribution may be based on channel occupancy (e.g., number of Wi-Fi devices stationed on the channel), perceived Wi-Fi signal strength at the small cell base station and/or UE, and/or Wi-Fi medium utilization on other SCCs.

In an additional aspect, the scheduling of the SCCs may be performed in a round robin manner for implementing a simple approach.

In an aspect, a SCC update receiving component at UE 460 is configured to receive a SCC update from small cell base station 400. In an additional aspect, a SCC tuning component at UE 460 is configured to schedule the UE on a second SCC in response to receiving the SCC update. In an optional aspect, a data receiving component at UE 460 is configured receive data from small cell base station 400 on the second SCC. In a further optional aspect, data received at the UE is transmitted from the small cell by spreading the data among second SCCs of the small cell in a non-uniform fashion.

Thus, improved performance of a user equipment (UE) operating in an unlicensed spectrum may be achieved.

Figure 10:
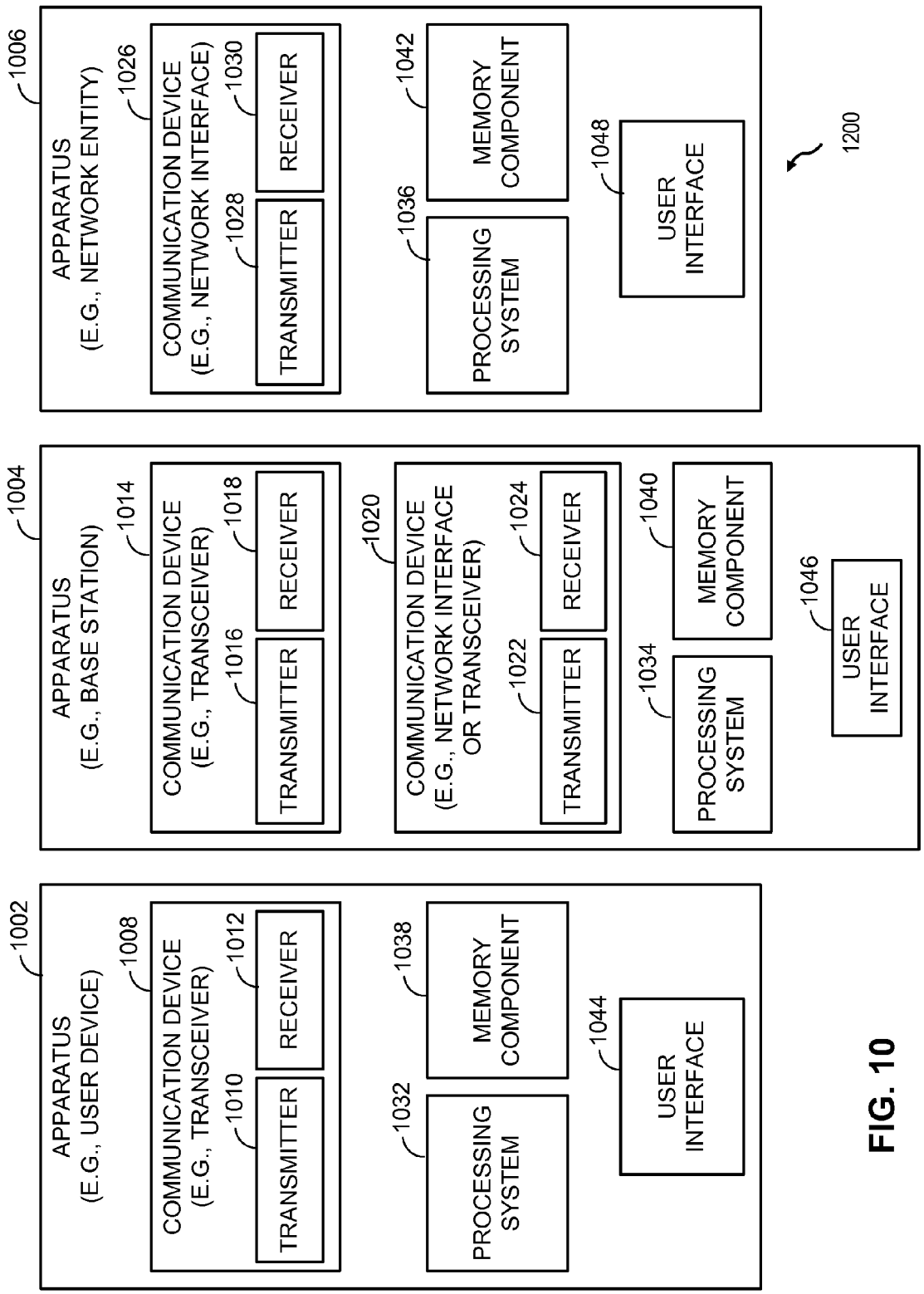
FIG. 10 is an example block diagram of an aspect of components that may be employed in communication nodes and configured to support communication as taught herein.

FIG. 10 illustrates several sample components (represented by corresponding blocks) that may be incorporated into an apparatus 1002, an apparatus 1004, and an apparatus 1006 (corresponding to, for example, a user device, a base station, and a network entity, respectively) to support the CSAT and related operations to improve performance of a UE, as taught herein. It will be appreciated that these components may be implemented in different types of apparatuses in different implementations (e.g., in an ASIC, in a SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1002 and the apparatus 1004 each include at least one wireless communication device (represented by the communication devices 1008 and 1014 (and the communication device 1020 if the apparatus 1004 is a relay)) for communicating with other nodes via at least one designated RAT. Each communication device 1008 includes at least one transmitter (represented by the transmitter 1010) for transmitting and encoding signals (e.g., messages, indications, information, and so on) and at least one receiver (represented by the receiver 1012) for receiving and decoding signals (e.g., messages, indications, information, pilots, and so on). Similarly, each communication device 1014 includes at least one transmitter (represented by the transmitter 1016) for transmitting signals (e.g., messages, indications, information, pilots, and so on) and at least one receiver (represented by the receiver 1018) for receiving signals (e.g., messages, indications, information, and so on). If the apparatus 1004 is a relay station, each communication device 1020 may include at least one transmitter (represented by the transmitter 1022) for transmitting signals (e.g., messages, indications, information, pilots, and so on) and at least one receiver (represented by the receiver 1024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1004 may also comprise a Network Listen Module (NLM) or the like for performing various measurements.

The apparatus 1006 (and the apparatus 1004 if it is not a relay station) includes at least one communication device (represented by the communication device 1026 and, optionally, 1020) for communicating with other nodes. For example, the communication device 1026 may comprise a network interface that is configured to communicate with one or more network entities via a wire-based or wireless backhaul. In some aspects, the communication device 1026 may be implemented as a transceiver configured to support wire-based or wireless signal communication. This communication may involve, for example, sending and receiving: messages, parameters, or other types of information. Accordingly, in the example of FIG. 10, the communication device 1026 is shown as comprising a transmitter 1028 and a receiver 1030. Similarly, if the apparatus 1004 is not a relay station, the communication device 1020 may comprise a network interface that is configured to communicate with one or more network entities via a wire-based or wireless backhaul. As with the communication device 1026, the communication device 1020 is shown as comprising a transmitter 1022 and a receiver 1024.

The apparatuses 1002, 1004, and 1006 also include other components that may be used in conjunction with the CSAT and related operations as taught herein. The apparatus 1002 includes a processing system 1032 for providing functionality relating to, for example, user device operations to support CSAT and related aspects as taught herein and for providing other processing functionality. The apparatus 1004 includes a processing system 1034 for providing functionality relating to, for example, base station operations to support CSAT and related aspects as taught herein and for providing other processing functionality. The apparatus 1006 includes a processing system 1036 for providing functionality relating to, for example, network operations to support CSAT and related aspects as taught herein and for providing other processing functionality. The apparatuses 1002, 1004, and 1006 include memory components 1038, 1040, and 1042 (e.g., each including a memory device), respectively, for maintaining information (e.g., information indicative of reserved resources, thresholds, parameters, and so on). In addition, the apparatuses 1002, 1004, and 1006 include user interface devices 1044, 1046, and 1048, respectively, for providing indications (e.g., audible and/or visual indications) to a user and/or for receiving user input (e.g., upon user actuation of a sensing device such a keypad, a touch screen, a microphone, and so on).

For convenience, the apparatuses 1002, 1004, and/or 1006 are shown in FIG. 10 as including various components that may be configured according to the various examples described herein. It will be appreciated, however, that the illustrated blocks may have different functionality in different designs.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1008, 1032, 1038, and 1044 may be implemented by processor and memory component(s) of the apparatus 1002 (e.g., by execution of appropriate code and/or by appropriate configuration of processor components). Similarly, some or all of the functionality represented by blocks 1014, 1020, 1034, 1040, and 1046 may be implemented by processor and memory component(s) of the apparatus 1004 (e.g., by execution of appropriate code and/or by appropriate configuration of processor components). Also, some or all of the functionality represented by blocks 1026, 1036, 1042, and 1048 may be implemented by processor and memory component(s) of the apparatus 1006 (e.g., by execution of appropriate code and/or by appropriate configuration of processor components).

Figure 11:
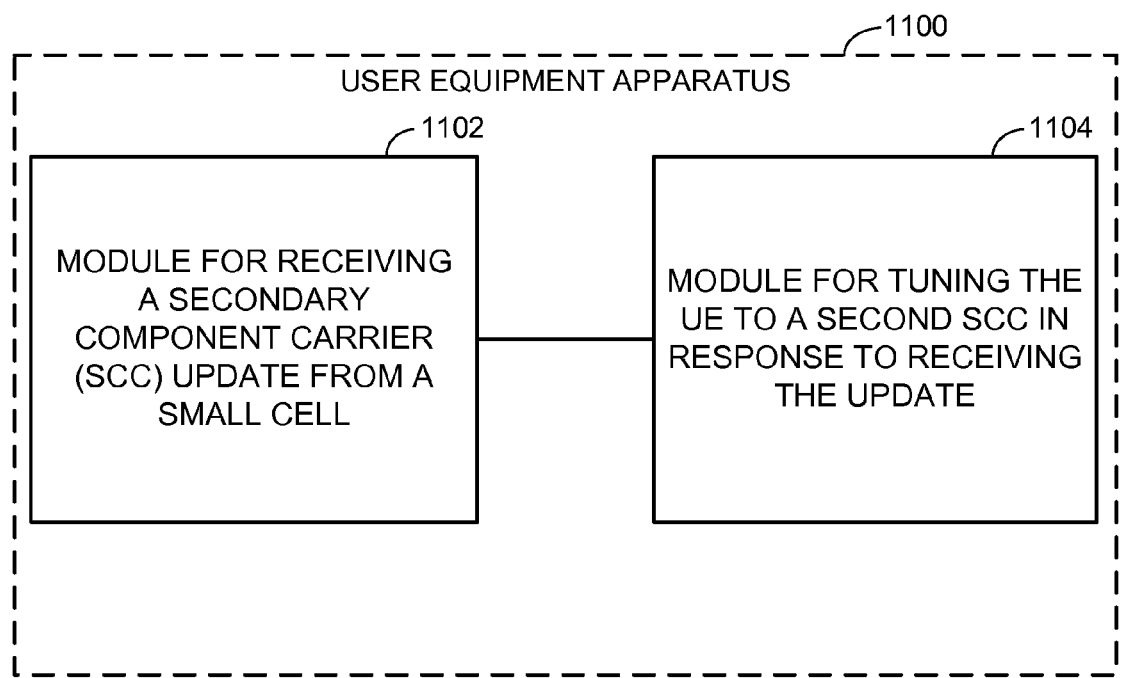
FIG. 11 is an example block diagrams of an aspects of apparatus configured to support communication as taught herein.

FIG. 11 illustrates an example user equipment apparatus 1100 represented as a series of interrelated functional modules. A module for receiving 1102 may correspond at least in some aspects to, for example, a communication device as discussed herein. A module for scheduling 1104 may correspond at least in some aspects to, for example, a processing system as discussed herein.

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

Figure 12:
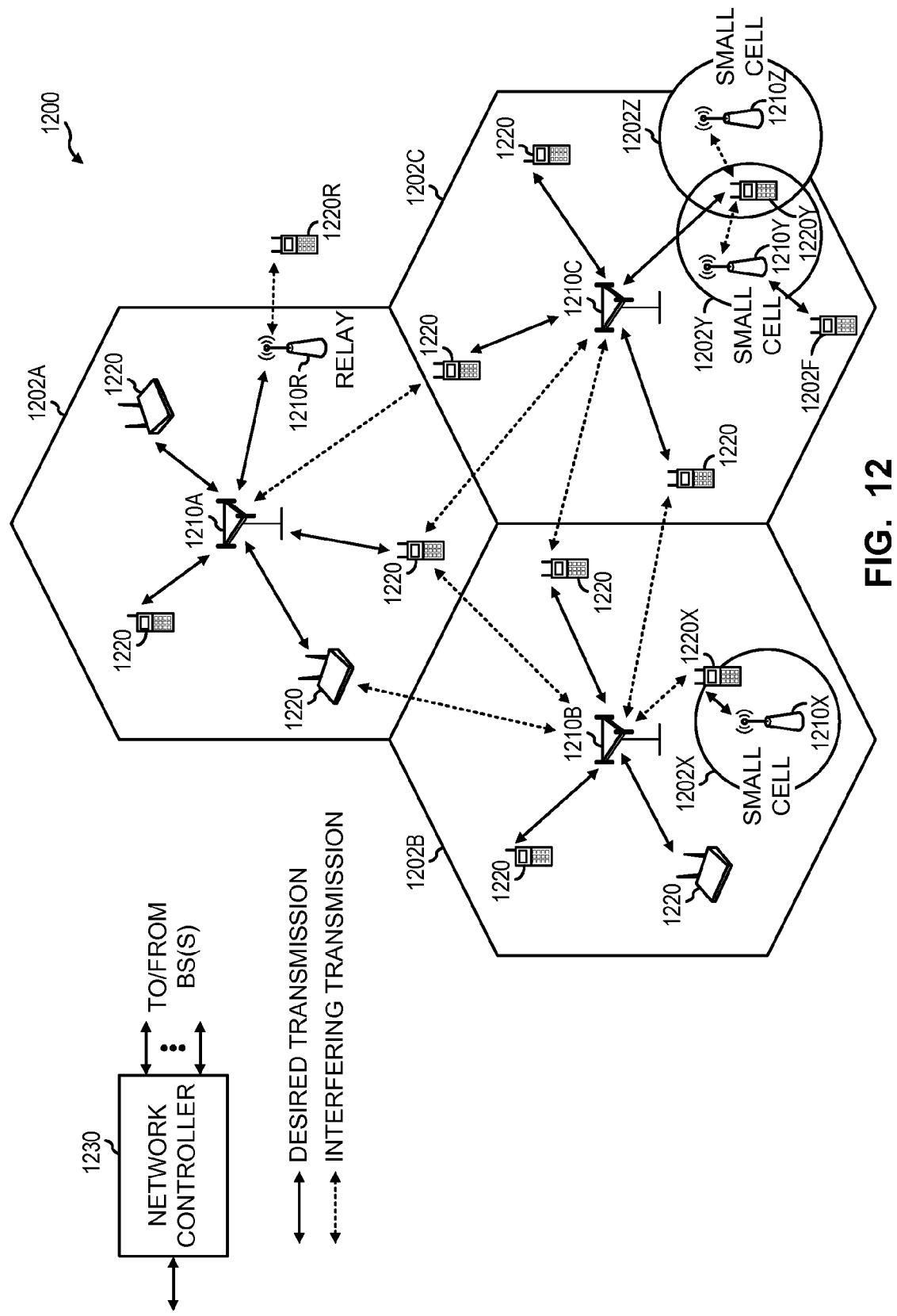
FIG. 12 illustrates an example communication system environment in which the teachings and structures herein may be may be incorporated.

FIG. 12 illustrates an example communication system environment in which the CSAT and related operation teachings and structures herein may be may be incorporated. The wireless communication system 1200, which will be described at least in part as an LTE network for illustration purposes, includes a number of eNBs 1210 and other network entities. Each of the eNBs 1210 provides communication coverage for a particular geographic area, such as macro cell or small cell coverage areas.

In the illustrated example, the eNBs 1210A, 1210B, and 1210C are macro cell eNBs for the macro cells 1202A, 1202B, and 1202C, respectively. The macro cells 1202A, 1202B, and 1202C may cover a relatively large geographic area (e.g., several kilometers in radius) and may allow unrestricted access by UEs with service subscription. The eNB 1210X is a small cell base station for the small cell 1202X. The small cell 1202X may cover a relatively small geographic area and may allow unrestricted access by UEs with service subscription. Additionally, eNBs 1210Y and 1210Z are small cells base stations for the small cells 1202Y and 1202Z, respectively. The small cells 1202Y and 1202Z may cover a relatively small geographic area (e.g., a home) and may allow unrestricted access by UEs (e.g., when operated in an open access mode) or restricted access by UEs having association with the small cell (e.g., UEs in a Closed Subscriber Group (CSG), UEs for users in the home, etc.), as discussed in more detail below.

The wireless network 1200 also includes a relay station 1210R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 12, the relay station 1210R communicates with the eNB 1210A and a UE 1220R in order to facilitate communication between the eNB 1210A and the UE 1220R. A relay station may also be referred to as a relay eNB, a relay, etc.

The wireless network 1200 is a heterogeneous network in that it includes eNBs of different types, including macro eNBs, small cell eNBs, relays, etc. As discussed in more detail above, these different types of eNBs may have different transmit power levels, different coverage areas, and different impacts on interference in the wireless network 1200. For example, macro eNBs may have a relatively high transmit power level whereas small eNBs and relays may have a lower transmit power level (e.g., by a relative margin, such as a 10 dBm difference or more).

Returning to FIG. 12, the wireless network 1200 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1230 may couple to a set of eNBs and provide coordination and control for these eNBs. The network controller 1230 may communicate with the eNBs 1210 via a backhaul. The eNBs 1210 may also communicate with one another, e.g., directly or indirectly via a wireless or wireline backhaul.

As shown, the UEs 1220 may be dispersed throughout the wireless network 1200, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 12, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1220Y may be in proximity to small cell eNBs 1210Y, 1210Z. Uplink transmissions from UE 1220Y may interfere with small cell eNBs 1210Y, 1210Z. Uplink transmissions from UE 1220Y may jam small cell eNBs 1210Y, 1210Z and degrade the quality of reception of other uplink signals to small cell eNBs 1210Y, 1210Z.

Small cell eNBs such as eNB 1210X and 1210Y, 1210Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, small cell eNB 1210Y may be an open-access small cell eNB with no restricted associations to UEs. The small cell eNB 1210Z may be a higher transmission power eNB initially deployed to provide coverage to an area. Small cell eNB 1210Z may be deployed to cover a large service area. Meanwhile, small cell eNB 1210Y may be a lower transmission power eNB deployed later than small cell eNB 1210Z to provide coverage for a hotspot area (e.g., a sports arena or stadium) for loading traffic from either or both eNB 1210C, eNB 1210Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for CSAT and related operations.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for improving performance of a user equipment (UE) operating in unlicensed spectrum, comprising:
   receiving, at the UE, a secondary component carrier (SCC) update from a small cell; and
   tuning the UE to a second SCC in response to receiving the update, wherein the update is received at the UE when the small cell operating on a first radio access technology (RAT) determines that a channel associated with a first SCC of the small cell is also in use by another entity operating on a second RAT.

2. The method of claim 1, wherein tuning the UE to the second SCC includes receiving data on the second SCC and wherein the tuning is performed via a frequency or a channel hopping.

3. The method of claim 2, wherein the tuning includes de-activating of the first SCC and activating of the second SCC using media access control (MAC) layer commands.

4. The method of claim 2, wherein a combination of cell global identity (CGI) and a public land mobile network identifier (PLMN ID) is used to orthogonalize the frequency or the channel hopping among base stations of the first RAT.

5. The method of claim 1, further comprising:
   receiving data from the small cell on the second SCC, wherein the data received at the UE is transmitted from the small cell by spreading the data among SCCs of the small cell in a non-uniform fashion.

6. The method of claim 1, wherein the SSC update is received at the UE via a radio resource control (RRC) re-configuration message.

7. The method of claim 1, wherein the first RAT is a long term evolution (LTE) and the second RAT is a wireless fidelity (Wi-Fi).

8. An apparatus for improving performance of a user equipment (UE) operating in unlicensed spectrum, comprising:
   means for receiving, at the UE, a secondary component carrier (SCC) update from a small cell; and
   means for tuning the UE to a second SCC in response to receiving the update, wherein the update is received at the UE when the small cell operating on a first radio access technology (RAT) determines that a channel associated with a first SCC of the small cell is also in use by another entity operating on a second RAT.

9. The apparatus of claim 8, wherein means for tuning the UE to the second SCC includes means for receiving data on the second SCC and wherein the tuning is performed via a frequency or a channel hopping.

10. The apparatus of claim 9, wherein the means for tuning includes means for de-activating of the first SCC and activating of the second SCC using media access control (MAC) layer commands.

11. The apparatus of claim 9, wherein a combination of cell global identity (CGI) and a public land mobile network identifier (PLMN ID) is used to orthogonalize the frequency or the channel hopping among base stations of the first RAT.

12. The apparatus of claim 8, further comprising:
   means for receiving data from the small cell on the second SCC, wherein the data received at the UE is transmitted from the small cell by spreading the data among SCCs of the small cell in a non-uniform fashion.

13. The apparatus of claim 8, wherein the SSC update is received at the UE via a radio resource control (RRC) re-configuration message.

14. The apparatus of claim 8, wherein the first RAT is a long term evolution (LTE) and the second RAT is a wireless fidelity (Wi-Fi).

15. A non-transitory computer readable medium storing computer executable code for improving performance of a user equipment (UE) operating in unlicensed spectrum, comprising code to:
  receive, via a secondary component carrier (SCC) update receiving component, a SCC update from a small cell; and
  tune, via a SCC tuning component, the UE to a second SCC in response to receiving the update, wherein the update is received at the UE when the small cell operating on a first radio access technology (RAT) determines that a channel associated with a first SCC of the small cell is also in use by another entity operating on a second RAT.

16. The computer readable medium of claim 15, wherein the code for tuning the UE to the second SCC includes code for tuning the UE from the first SCC to the second SCC and wherein the tuning is performed via a frequency or a channel hopping.

17. The computer readable medium of claim 16, wherein the code for tuning includes code for de-activating of the first SCC and activating of the second SCC using media access control (MAC) layer commands.

18. The computer readable medium of claim 16, wherein a combination of cell global identity (CGI) and a public land mobile network identifier (PLMN ID) is used to orthogonalize the frequency or the channel hopping among base stations of the first RAT.

19. The computer readable medium of claim 15, further comprising:
  code for receiving data from the small cell on the second SCC, wherein the data received at the UE is transmitted from the small cell by spreading the data among SCCs of the small cell in a non-uniform fashion.

20. The computer readable medium of claim 15, wherein the SSC update is received at the UE via a radio resource control (RRC) re-configuration message.

21. The computer readable medium of claim 15, wherein the first RAT is a long term evolution (LTE) and the second RAT is a wireless fidelity (Wi-Fi).

22. An apparatus for improving performance of a user equipment (UE) operating in unlicensed spectrum, comprising:
  a memory; and
  at least one processor coupled to the memory and configured to:
    receive component to receive a SCC update from a small cell; and
    tune the UE to a second SCC in response to receiving the update, wherein the update is received at the UE when the small cell operating on a first radio access technology (RAT) determines that a channel associated with a first SCC of the small cell is also in use by another entity operating on a second RAT.

23. The apparatus of claim 22, wherein the at least one processor is further configured to tune the UE from the first SCC to the second SCC and wherein the tuning is performed via a frequency or a channel hopping.

24. The apparatus of claim 23, wherein the at least one processor is further configured to de-activate the first SCC and activate the second SCC using media access control (MAC) layer commands.

25. The apparatus of claim 23, wherein a combination of cell global identity (CGI) and a public land mobile network identifier (PLMN ID) is used to orthogonalize the frequency or the channel hopping among base stations of the first RAT.

26. The apparatus of claim 22, wherein the at least one processor is further configured to receive data from the small cell on the second SCC, wherein the data received at the UE is transmitted from the small cell by spreading the data among second SCCs of the small cell in a non-uniform fashion.

27. The apparatus of claim 22, wherein the SSC update is received at the UE via a radio resource control (RRC) re-configuration message.

28. The apparatus of claim 22, wherein the first RAT is a long term evolution (LTE) and the second RAT is a wireless fidelity (Wi-Fi).

* * * * *